United States Patent
Vos (10) Patent No.: US 10,427,719 B2
(45) Date of Patent: Oct. 1, 2019

(54) INTERIOR PANELS FOR MOTOR VEHICLES AND METHODS FOR MAKING THE SAME

(71) Applicant: FAURECIA INTERIOR SYSTEMS, INC., Auburn Hills, MI (US)

(72) Inventor: Kevin Vos, White Lake, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 85 days.

(21) Appl. No.: 15/711,568

(22) Filed: Sep. 21, 2017

(65) Prior Publication Data

US 2019/0084625 A1    Mar. 21, 2019

(51) Int. Cl.
| | |
|---|---|
| B62D 25/14 | (2006.01) |
| B29C 44/12 | (2006.01) |
| B62D 29/04 | (2006.01) |
| B32B 5/18 | (2006.01) |
| B60R 13/02 | (2006.01) |

(52) U.S. Cl.
CPC .......... B62D 25/14 (2013.01); B29C 44/1257 (2013.01); B29C 44/1266 (2013.01); B32B 5/18 (2013.01); B60R 13/0256 (2013.01); B62D 29/04 (2013.01)

(58) Field of Classification Search
CPC ..... B29C 44/00; B29C 44/10; B29C 44/1228; B29C 44/1257; B29C 44/1266; B29C 44/14; B29C 44/146; B60R 13/02; B60R 13/0256; B62D 25/14; B62D 25/142
USPC ................................. 296/1.08, 70
See application file for complete search history.

(56) References Cited

U.S. PATENT DOCUMENTS

| | | | | |
|---|---|---|---|---|
| 5,658,652 A | * | 8/1997 | Sellergren | B60H 1/00428 156/79 |
| 5,851,624 A | * | 12/1998 | Ang | B29C 37/0057 428/68 |
| 6,071,591 A | * | 6/2000 | Dausch | B29C 33/505 428/132 |
| 6,375,878 B1 | | 4/2002 | Gray et al. | |
| 9,545,953 B2 | * | 1/2017 | Wolff | B60R 21/045 |
| 2010/0183841 A1 | * | 7/2010 | Mally | B29C 44/1257 428/138 |
| 2016/0107346 A1 | * | 4/2016 | Kang | B29C 44/1266 264/267 |

FOREIGN PATENT DOCUMENTS

| | | |
|---|---|---|
| FR | 3005619 A1 | 11/2014 |
| FR | 3005619 B1 * | 5/2016 |
| WO | 2004098854 A2 | 11/2004 |

* cited by examiner

*Primary Examiner* — Jason S Daniels
(74) *Attorney, Agent, or Firm* — LKGlobal | Lorenz & Kopf, LLP (57) ABSTRACT

Interior panels for motor vehicles and methods for making such interior panels are provided. In one example, an interior panel includes a substrate and a skin covering that at least partially overlays the substrate. A foam is disposed between the skin covering and the substrate. A gas-receiving hollow structure is at least partially disposed in the foam. The gas-receiving hollow structure has an opening configured for receiving gas and includes a wall that at least partially surrounds a chamber that is in fluid communication with the opening.

16 Claims, 5 Drawing Sheets

INTERIOR PANELS FOR MOTOR VEHICLES AND METHODS FOR MAKING THE SAME

TECHNICAL FIELD

The technical field relates generally to interior panels for motor vehicles, and more particularly to interior panels including a substrate, a skin covering, and foam that is disposed between the skin covering and the substrate and methods for making such an interior panel.

BACKGROUND

Motor vehicles often include an interior vehicle panel, such as an instrument panel, door panel, a trim panel, and/or the like. Foamed interior panels, such as, for example, foam-in-place (FIP) interior panels or other interior panels made by alternative foaming processes, are often used to provide a padded finish to desired areas of the interiors of motor vehicles. Foamed interior panels include a substrate and a skin covering with a foam layer arranged between the skin covering and the substrate to provide padding for a softer finish. During fabrication of, for example, a FIP interior panel, the foam layer is typically formed by injecting a liquid, e.g., polyurethane precursors such as diisocynates and polyols, or other liquid foam forming material(s), between the substrate and the skin covering that are supported in a foam tool.

One issue for foamed interior panels is that relatively large air pockets or foam voids can be formed in the foam layer during fabrication of the panel due to, for example, its part geometry, variations in flow of the liquid foam forming material(s), and/or inadequately venting of the foam tool during foaming. In one example disclosed in U.S. Pat. No. 6,375,878, issued to Gray et al., an instrument panel of an automotive vehicle is formed using an FIP process. An outer skin layer is positioned topside down in a cavity of a mold tool shaped in accordance with the desired shape of the instrument panel. A retainer is inserted into the mold tool and supported in spaced relation to the outer skin layer to provide a foam space therebetween. Suitable foam reactants are then introduced into the foam space where they react, expand and cure to fill the foam space and generate a foam layer. Unfortunately, gaps or spaces can be formed in the foam layer due to imperfections, pressure buildup, and/or designed clearances that trap air or gas in the liquid foam forming material(s) during the FIP process.

Another issue for foamed interior panels is providing adequate stiffness to areas of the panel where the foam is not necessarily fully supported by the substrate and/or other underlying structure. For example, the rearward in-vehicle edge (e.g., the brow or cantilevered section) of a foamed instrument panel often includes a foam section that extends rearward from an edge of a substrate. As such, the foam section is cantilevered from and/or is not fully supported by the substrate and can droop or otherwise sag due to sun load(s), manual forces (e.g., hand pushing or pulling down on the area), and/or other external forces.

Accordingly, it is desirable to provide foamed interior panels that overcome one or more of the foregoing issues. Furthermore, other desirable features and characteristics of the present disclosure will become apparent from the subsequent detailed description and the appended claims, taken in conjunction with the accompanying drawings and this background.

BRIEF SUMMARY

Interior panels for motor vehicles and methods for making such interior panels are provided herein. In accordance with an exemplary embodiment, an interior panel includes a substrate and a skin covering that at least partially overlays the substrate. A foam is disposed between the skin covering and the substrate. A gas-receiving hollow structure is at least partially disposed in the foam. The gas-receiving hollow structure has an opening configured for receiving gas and includes a wall that at least partially surrounds a chamber that is in fluid communication with the opening.

In accordance with another exemplary embodiment, a method of making an interior panel for a motor vehicle is provided. The method includes disposing a skin covering adjacent to a substrate. A gas-receiving hollow structure is disposed adjacent to the skin covering. The gas-receiving hollow structure has an opening configured for receiving gas and includes a wall that at least partially surrounds a chamber that is in fluid communication with the opening. A liquid foam forming material is advanced between the skin covering and the substrate and towards the opening of the gas-receiving hollow structure. The liquid foam forming material is solidified to form a foam. The gas-receiving hollow structure is at least partially disposed in the foam.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to interior panels for motor vehicles, and methods for making such interior panels. The exemplary embodiments taught herein provide an interior panel for a motor vehicle. The interior panel is made by disposing a skin covering adjacent to a substrate, for example, in spaced relation in a foam molding tool. A gas-receiving hollow structure is disposed adjacent to the skin covering, for example, in the space between the skin covering and the substrate. The gas-receiving hollow structure has an opening configured for receiving gas and includes a wall that at least partially surrounds a chamber that is in fluid communication with the opening. A liquid foam forming material is advanced between the skin covering and the substrate (e.g., using a FIP process, open pour foaming process, or the like) and towards the opening of the gas-receiving hollow structure. The liquid foam forming material is solidified to form a foam with the gas-receiving hollow structure at least partially disposed in the foam.

In an exemplary embodiment, it has been found that by having the gas-receiving hollow structure disposed adjacent to the skin covering, for example, in the space between the skin covering and the substrate, the opening of the gas-receiving hollow structure is positioned to readily receive any air or gas that might otherwise become trapped proximate to the opening when the liquid foam forming material is advanced towards the opening during the foaming process. The air or gas received through the opening is passed along and stored in the chamber of the gas-receiving hollow structure to keep the sequestered air or gas separate from the liquid foam forming material that is outside of the gas-receiving hollow structure. As such, advantageously a more uniform foam without relatively large air pockets or foam voids can be formed when the liquid foam forming material is subsequently solidified.

In another additional advantage of the interior panel disclosed herein is that, in some embodiments, the interior panel includes the skin covering at least partially overlaying the substrate. The foam is disposed between the skin covering and the substrate and the gas-receiving hollow structure is at least partially disposed in the foam. In an exemplary embodiment, advantageously the gas-receiving hollow structure helps support the foam to provide adequate stiffness to the associated area(s) of the interior panel, for example, where the foam is not necessarily fully supported by the substrate to prevent drooping or sagging due to sun load(s), manual forces (e.g., hand pushing or pulling down on the area), and/or other external forces.

In an additional advantage of the interior panel disclosed herein is that, in some embodiments, the wall of the gas-receiving hollow structure extends longitudinally to define an elongated body with the chamber disposed therein. The elongated body allows the gas-receiving hollow structure to be arranged in relatively narrow spaces between the skin covering and the substrate, for example, in the brow area or the like of the interior panel. Additionally, the elongated body helps to provide adequate stiffness to such areas.

An additional advantage of the interior panel disclosed herein is that, in some embodiments, the gas-receiving hollow structure further includes at least one spacer that extends outwardly from the elongated body and that contacts at least one of the skin covering and the substrate. The spacers facilitate consistently positioning the gas-receiving hollow structure in a desired area between the skin covering and the substrate during manufacturing of the interior panel.

In an additional advantage of the interior panel disclosed herein is that, in some embodiments, the at least one spacer includes foam material. The foam material helps the spacer(s) to be positioned inconspicuously in the foam to provide a consistent padded finish to the interior panel.

An additional advantage of the interior panel disclosed herein is that, in some embodiments, the at least one spacer includes two adjacent spacers that are spaced apart from each other a distance from about 50 to about 400 mm. By having two adjacent spacers spaced apart such a distance facilitates consistently positioning the gas-receiving hollow structure in a desired area between the skin covering and the substrate during manufacturing of the interior panel.

In an additional advantage of the interior panel disclosed herein is that, in some embodiments, the elongated body is substantially tubular having a substantially circular cross-sectional shape with an outer diameter and an inner diameter. By having the elongated body substantially tubular facilitates efficiently manufacturing the gas-receiving hollow structure, for example, by an extrusion process or the like.

An additional advantage of the interior panel disclosed herein is that, in some embodiments, the elongated body has an outer diameter from about 3 mm to about 7 mm and an inner diameter from about 1 to about 5 mm. By having the elongated body with such inner and outer diameters, the gas-receiving hollow structure can provide adequate stiffness to desired areas of the interior panel, and independently, can provide adequate storage volume in the chamber for receiving and storing air or gas that is proximate to the opening of the gas-receiving hollow structure during manufacturing of the interior panel.

In an additional advantage of the interior panel disclosed herein is that, in some embodiments, the elongated body has a cross-sectional shape selected from the group of a substantially triangular cross-sectional shape, a substantially rectangular cross-sectional shape, a substantially orthogonal cross-sectional shape, a substantially polygonal cross-sectional shape, a substantially cross-sectional splined shape, and a substantially cross-sectional oval shape. By having the elongated body with such a cross-sectional shape(s) facilitates efficiently manufacturing the gas-receiving hollow structure, for example, by an extrusion process or the like.

An additional advantage of the interior panel disclosed herein is that, in some embodiments, the wall of the gas-receiving hollow structure defines a substantially block and/or wedge shaped body with the chamber disposed therein. A substantially block and/or wedge shaped body allows the gas-receiving hollow structure to be consistently positioned in a desired area of the interior panel during manufacturing of the panel, for example, in a corner area or the like.

In an additional advantage of the interior panel disclosed herein is that, in some embodiments, the opening is formed through the wall of the substantially block and/or wedge shaped body open to the chamber. By forming the opening through the wall of the substantially block and/or wedge shaped body, the opening can be strategically positioned to be proximate an area of the interior panel that may otherwise be susceptible to trapping air or gas during foaming.

An additional advantage of the interior panel disclosed herein is that, in some embodiments, the gas-receiving hollow structure is integrally formed as a part of the substrate. By integrally forming the gas-receiving hollow structure as part of the substrate, the gas-receiving hollow structure can be efficiently and economically formed during fabrication of the substrate and further, can be consistently positioned in a desired area of the interior panel during manufacturing of the panel.

In an additional advantage of the interior panel disclosed herein is that, in some embodiments, the interior panel has a cantilevered skin-foam section extending from an edge portion of the substrate, and the gas-receiving hollow structure is disposed in a portion of the foam that is disposed in the cantilevered skin-foam section. By positioning the gas-receiving hollow structure in the cantilevered skin-foam section, the gas-receiving hollow structure helps support the foam in this section to provide adequate stiffness, for example, to prevent drooping or sagging due to sun load(s), manual forces (e.g., hand pushing or pulling down on the area), and/or other external forces.

An additional advantage of the interior panel disclosed herein is that, in some embodiments, the interior panel has a corner skin-foam section, and the opening of the gas-receiving hollow structure is disposed in a portion of the foam that is in or proximate to the corner skin-foam section. Positioning the opening of the gas-receiving hollow structure in or near the corner skin-foam section helps to readily receive and remove any air or gas that might otherwise be trapped proximate to this area during foaming.

In an additional advantage of the interior panel disclosed herein is that, in some embodiments, the interior panel is an instrument panel that has a brow section and the gas-receiving hollow structure is disposed in a portion of the foam that is disposed in the brow section. By positioning the gas-receiving hollow structure in the brow section, the gas-receiving hollow structure helps support the foam in this area of the instrument panel to provide adequate stiffness, for example, to prevent drooping or sagging due to sun load(s), manual forces (e.g., hand pushing or pulling down on the area), and/or other external forces.

Figure 1:
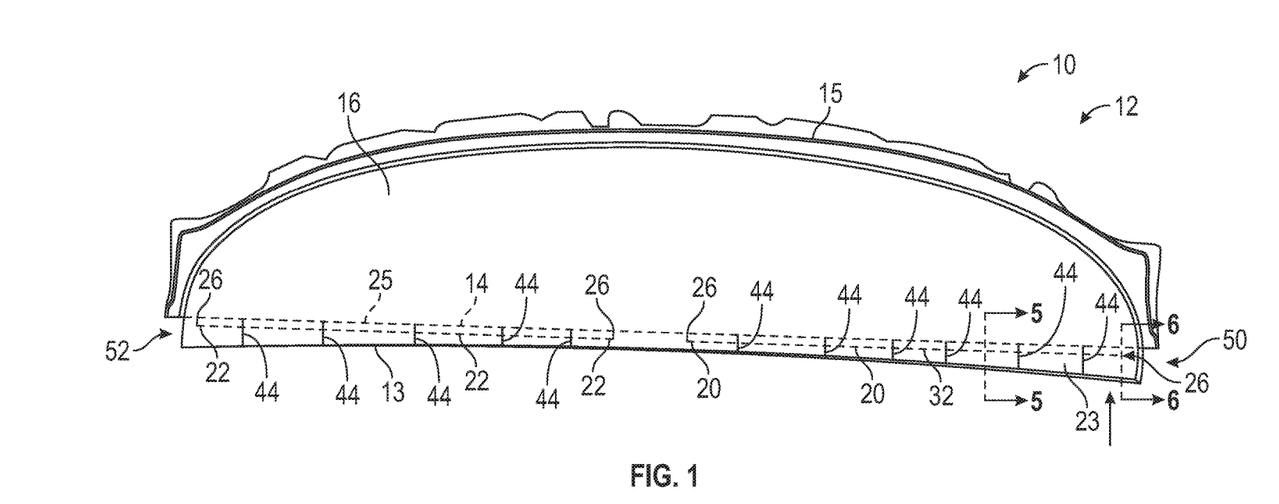
FIG. 1 is a top view of an interior panel for a motor vehicle in accordance with an exemplary embodiment.
Figure 2:
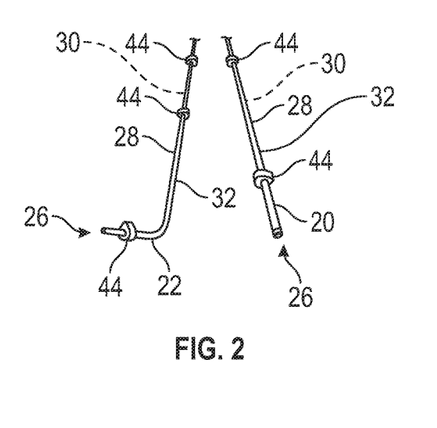
FIG. 2 is a perspective view of portions of two gas-receiving hollow structures in accordance with an exemplary embodiment.
Figure 5A:
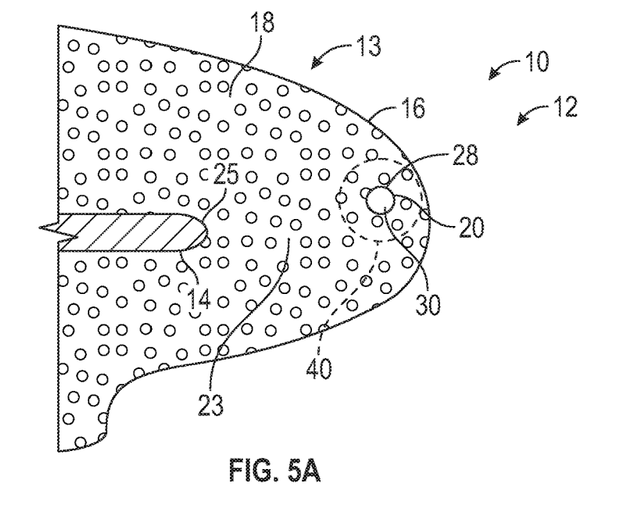
FIGS. 5A-5F are cross-sectional views of a portion of the interior panel depicted in FIG. 1 along line 5-5.
Figure 5B:
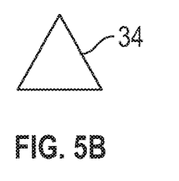
Figure 5C:
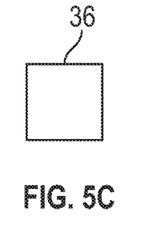
Figure 5D:
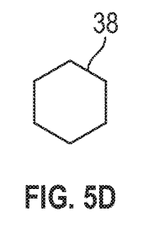
Figures 5E, 5F, 6:
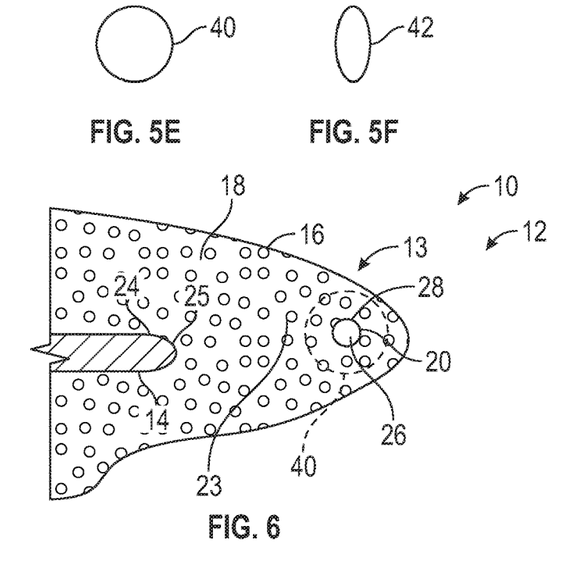
FIG. 6 is a cross-sectional view of a portion of the interior panel depicted in FIG. 1 along line 6-6.

FIG. 1 is a top view of an interior panel 10 for a motor vehicle in accordance with an exemplary embodiment. FIG. 6 is a cross-sectional view of a portion of the interior panel 10 depicted in FIG. 1 along line 6-6. Referring to FIGS. 1 and 6, in an exemplary embodiment, the interior panel 10 is an instrument panel 12 that can be positioned forward of a driver seat and a front passenger seat in an interior of the motor vehicle. As illustrated, the instrument panel 12 has a brow section 13 that is a rearward in-vehicle edge that extends cross-car just forward of the driver and front passenger seats. Opposite the brow section 13 of the instrument panel 12 is a cowl section 15 that is a forward in-vehicle edge and that extends cross-car. Alternatively, the interior panel 10 can be a door panel or other interior vehicle trim panel.

The interior panel 10 includes a substrate 14, a skin covering 16, a foam 18 that is disposed between the skin covering 16 and the substrate 14, and gas-receiving hollow structures 20 and 22 that are at least partially disposed in the foam 18. The outer surface of the substrate 14 is covered by the foam 18 and the skin covering 16 to define the interior panel 10 as a foamed interior panel. In one example, one or more of the gas-receiving hollow structures 20 and/or 22 are separate and distinct from the substrate 14. In another example, one or more of the gas-receiving hollow structures 20 and/or 22 are integrally formed as part of the substrate 14, for example, during fabrication of the substrate 14 using a forming and/or molding process, e.g., injection molding, insert molding, and/or the like. For example, the substrate 14 may have a substrate body portion and the one or more gas-receiving hollow structures 20 and/or 22 can extend as an extension portion(s) of the substrate 14 from the substrate body portion.

The substrate 14 may be formed of a plastic material, such as, for example, styrene maleic anhydride (SMA), polycarbonate (PC), ABS, PC/ABS, polypropylene (PP), or the like by an injection molding process or other known manufacturing technique. The skin covering 16 may be formed of a thermoplastic material, such as polyvinylchloride, thermoplastic urethane, thermoplastic olefin, or the like, according to known manufacturing techniques, but could also be made of a thermoset polymer such as thermoset urethane or the like. The foam 18 may be formed by an FIP process, open pour foaming process, or the like, and foam reactants materials, such as polyurethane foam precursors such as diisocynates and polyols, or other liquid foam forming material(s).

Referring to FIGS. 1-2, 5a, and 6, in an exemplary embodiment, the gas-receiving hollow structures 20 and 22 are disposed in portions of the foam 18 that are in the brow section 13 just forward of the passenger front seat and the driver seat, respectively. The brow section 13 includes a cantilevered skin-foam section 23 extending from an edge portion 25 of the substrate 14. The gas-receiving hollow structures 20 and 22 are disposed in the portions of the foam 18 that are disposed in the cantilevered skin-foam section 23. Alternatively, the gas-receiving hollow structures 20 and 22 may be arranged in other portions of the foam 18 that are not in the brow section 13 and/or the cantilevered skin-foam section 23 of the interior panel 10.

The gas-receiving hollow structures 20 and 22 may be formed of plastic material, metal, or the like using conventional manufacturing techniques, such as, for example, an extrusion process, molding process, a metal forming process, or the like. As will be discussed in further detail below, the gas-receiving hollow structures 20 and 22 each have one or more openings 26 configured for receiving gas and include a wall that partially or fully surrounds a chamber 30 that is in fluid communication with the opening 26. As illustrated, the gas-receiving hollow structure 20 has two openings 26 one positioned in a corner skin-foam section 50 and the other towards a center section 55 of the brow section 13, and the gas-receiving hollow structure 22 has two openings 26 one positioned in a corner skin-foam section 52 and the other towards the center section 55 of the brow section 13.

In an exemplary embodiment, the wall 28 of the gas-receiving hollow structure(s) 20 or 22 extends longitudinally to define an elongated body 32 with the chamber 30 disposed therein surrounded by the wall 28. In one example, the elongated body 32 is substantially tubular (e.g., open ended tube that may be substantially straight, curved or bent (L-shaped)) having a substantially circular cross-sectional shape with an outer diameter and an inner diameter. The cross-sectional shape may be variable or non-variable along the length of the elongated body 32 and as such, the chamber 30 may have substantially the same cross-sectional dimensions as the one or more openings 26 or cross-sectional dimensions that are different than the one or more openings 26. In an exemplary embodiment, the outer diameter is from about 3 mm to about 7 mm and the inner diameter is from about 1 to about 5 mm. Referring also to FIGS. 5b-5f, alternatively the elongated body 32 can have a substantially noncircular cross-sectional shape (e.g., variable or non-variable along the length of the elongated body 32), such as, for example, a substantially triangular cross-sectional shape 34, a substantially orthogonal or rectangular cross-sectional shape 36, a substantially polygonal cross-sectional shape 38, a substantially cross-sectional splined shape 40, or a substantially cross-sectional oval shape 42.

Referring again to FIGS. 1-2, 5a, and 6 and as will be discussed in further detail below, the gas-receiving hollow structures 20 and 22 may independently include one or more spacers 44 that extend outwardly from the elongated body 32, for example, as disks or the like, and that contact the skin covering 16 and/or the substrate 14 to help position the gas-receiving hollow structure 20 in the space between the substrate 14 and the skin covering 16 during foaming. In an exemplary embodiment, the spacers 44 are formed of or include a foam material. Alternatively, the spacers 44 may include a material other than foam, such as, for example, a plastic material, an elastomeric material, or the like. In an exemplary embodiment, the gas-receiving hollow structures 20 and 22 may independently include at least two adjacent spacers that are spaced apart from each other a distance from about 50 to about 400 mm, for example from about 75 to about 200 mm.

Figure 7:
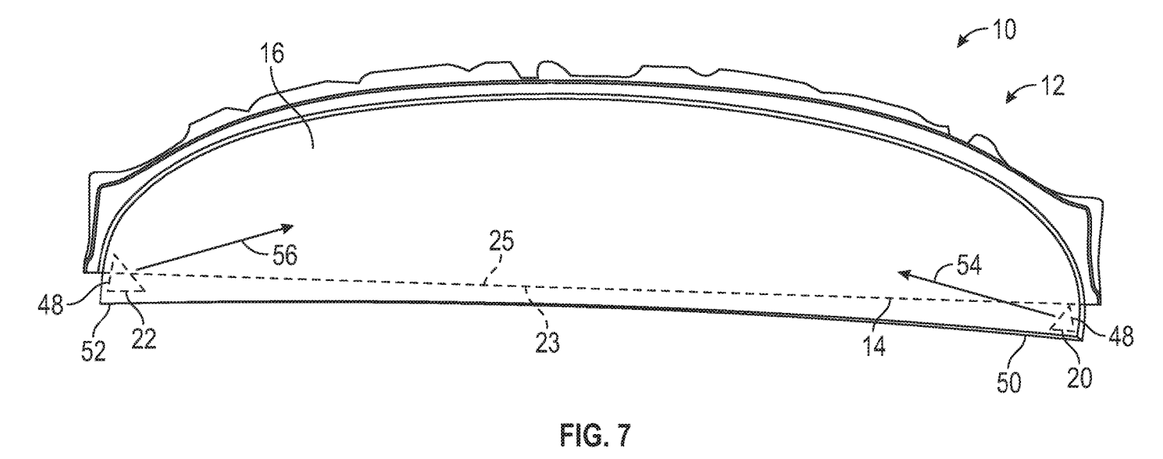
FIG. 7 is a top view of an interior panel for a motor vehicle in accordance with an exemplary embodiment.
Figure 8:
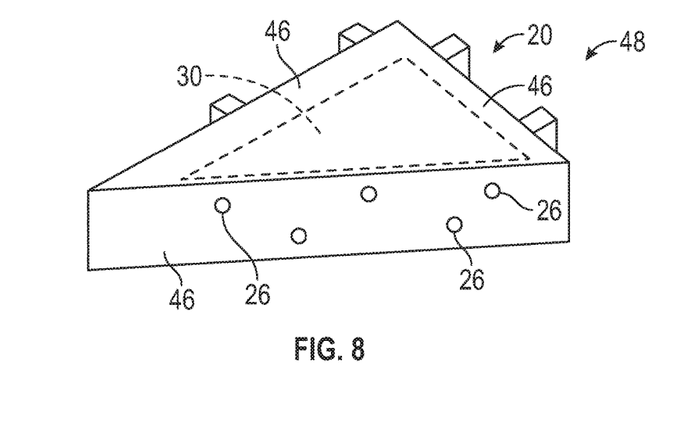
FIG. 8 is a perspective view of a gas-receiving hollow structure in accordance with an exemplary embodiment.

Referring to FIGS. 7-8, in an alternative embodiment, the gas-receiving hollow structure(s) 20 and/or 22 has a substantially non-elongated body. In a non-limiting example, the wall 46 of the gas-receiving hollow structure (s) 20 or 22 defines a substantially block and/or wedge (i.e., block/wedge) shaped body 48 with the chamber 30 disposed therein. One or more openings 26 for receiving gas are formed through the wall 46 of the substantially block/wedge shaped body 48 and are open to and in fluid communication with the chamber 30. In an exemplary embodiment, the openings 26 each have a dimension (e.g., diameter) of from about 1 to about 5 mm. As illustrated, the gas-receiving hollow structures 20 and 22 are correspondingly disposed in portions of the foam 18 that are disposed in the corner skin-foam sections 50 and 52 of the brow section 13 with the openings 26, for example, facing in forward-inboard directions (indicated by single headed arrows 54 and 56).

Figure 4:
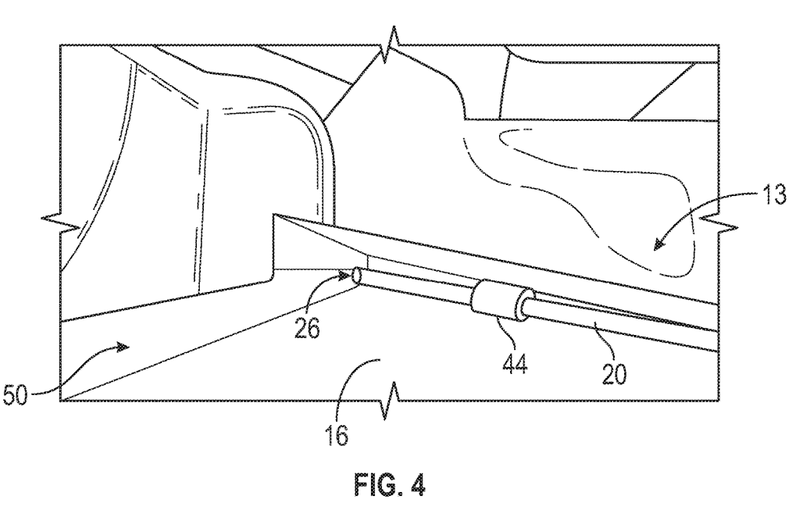
FIG. 4 is a rear view of a substrate, a skin covering, and a gas-receiving hollow structure during an intermediate fabrication stage of an interior panel in accordance with an exemplary embodiment.
Figure 9:
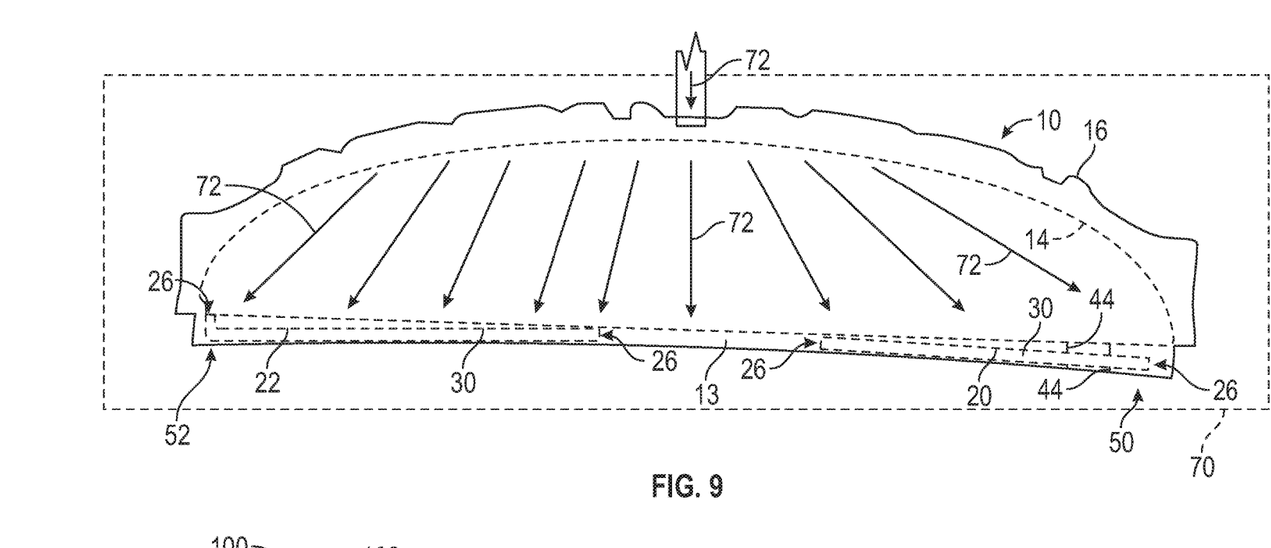
FIG. 9 is a schematic illustration of an interior panel for a motor vehicle during an advanced fabrication stage in accordance with an exemplary embodiment.
Figure 10:
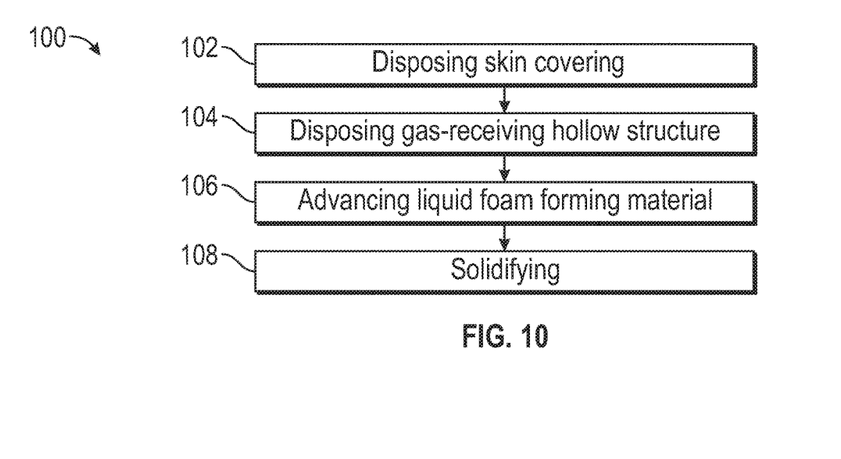
FIG. 10 is a flowchart of a method of making an interior panel for a motor vehicle in accordance with an exemplary embodiment.

Referring to FIGS. 4 and 9-10, a method 100 for making the interior panel 10 for a motor vehicle in accordance with an exemplary embodiment is provided. In an exemplary embodiment, the method 100 employs a foaming process, such as an FIP process, an open pour foaming process, or the like, and includes disposing (STEP 102) the skin covering 16 adjacent to the substrate 14 in spaced relationship in a molding tool 70. The gas-receiving hollow structures 20 and 22 are disposed (STEP 104) adjacent to the skin covering 16. As illustrated in FIG. 4, the gas-receiving hollow structure 20 is positioned in the space between the substrate 14 and the skin covering 16 with the opening 26 of the gas-receiving hollow structure 20 positioned in the space of the corner skin-foam section 50 of the brow section 13. The spacers 44 of the gas-receiving hollow structure 20 contact the inside surface of the skin covering 16 to help position the gas-receiving hollow structure 20 in relation to the skin covering 16 and/or the substrate 14.

The process continues by advancing (STEP 106) a liquid foam forming material 72 between the skin covering 16 and the substrate 14 and towards the openings 26 of the gas-receiving hollow structures 20 and 22. As the liquid foam forming material 72 is advanced in the space between the skin covering 16 and the substrate 14, air or gas is pushed by the flow front of the liquid foam forming material 72 towards the openings 26. The air or gas is advanced through the openings 26 into the chambers 30 such that the sequestered air or gas is kept separate from the liquid foam forming material 72 that is disposed outside of the gas-receiving hollow structures 20 and 22. For example, the liquid foam forming material 72 is advanced towards the opening 26 of the gas-receiving hollow structure 20 that is positioned in the corner skin-foam section 50 of the brow section 13. As the flow front of the liquid foam forming material 72 advances towards the corner skin-foam section 50, the air or gas in the corner skin-foam section 50 advances through the opening 26 into the chamber 30 of the gas-receiving hollow structure 20 to prevent relatively large trapped air or gas pockets from forming in the corner skin-foam section 50.

Figure 3:
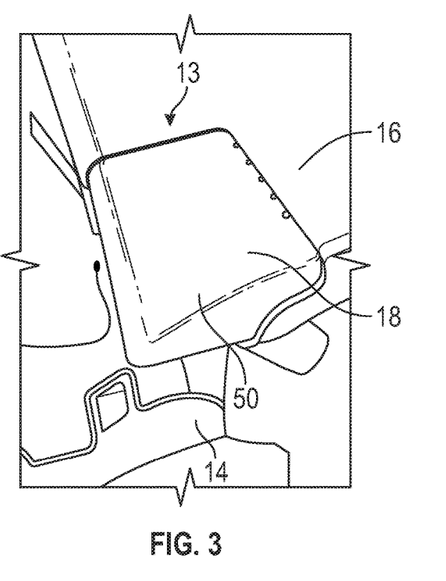
FIG. 3 is a perspective tear-away view of a corner section of an interior panel for a motor vehicle in accordance with an exemplary embodiment.

Referring also to FIG. 3, the liquid foam forming material 72 is solidified (STEP 108), e.g., cured as a function of time and/or temperature, to form the foam 18. As illustrated in FIG. 3, the foam 16 in the corner skin-foam section 50 of the brow section 13 is substantially uniform and without any relatively large air pockets or foam voids.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel for a motor vehicle, the interior panel comprising:
   a substrate;
   a skin covering at least partially overlying the substrate;
   a foam disposed between the skin covering and the substrate; and
   a gas-receiving hollow structure at least partially disposed in the foam, wherein the gas-receiving hollow structure has an opening configured for receiving gas and comprises a wall that at least partially surrounds a chamber that is in fluid communication with the opening, wherein the opening is disposed in and completely covered by the foam.

2. The interior panel of claim 1, wherein the wall of the gas-receiving hollow structure extends longitudinally to define an elongated body with the chamber disposed therein.

3. The interior panel of claim 2, wherein the gas-receiving hollow structure further comprises at least one spacer that extends outwardly from the elongated body and that contacts at least one of the skin covering and the substrate.

4. The interior panel of claim 3, wherein the at least one spacer comprises a foam material.

5. The interior panel of claim 3, wherein the at least one spacer comprises two adjacent spacers that are spaced apart from each other a distance of from about 50 to about 400 mm.

6. The interior panel of claim 2, wherein the elongated body is substantially tubular having a substantially circular cross-sectional shape with an outer diameter and an inner diameter.

7. The interior panel of claim 6, wherein the outer diameter is from about 3 mm to about 7 mm and the inner diameter is from about 1 to about 5 mm.

8. The interior panel of claim 2, wherein the elongated body has a cross-sectional shape selected from the group of a substantially triangular cross-sectional shape, a substantially rectangular cross-sectional shape, a substantially orthogonal cross-sectional shape, a substantially polygonal cross-sectional shape, a substantially cross-sectional splined shape, and a substantially cross-sectional oval shape.

9. The interior panel of claim 1, wherein the wall of the gas-receiving hollow structure defines a substantially block/wedge shaped body with the chamber disposed therein.

10. The interior panel of claim 9, wherein the opening is formed through the wall of the substantially block/wedge shaped body open to the chamber.

11. The interior panel of claim 1, wherein the gas-receiving hollow structure is integrally formed as a part of the substrate.

12. The interior panel of claim 1, wherein the interior panel has a cantilevered skin-foam section extending from an edge portion of the substrate, and wherein the gas-receiving hollow structure is disposed in a portion of the foam that is disposed in the cantilevered skin-foam section.

13. The interior panel of claim 1, wherein the interior panel has a corner skin-foam section, and wherein the opening of the gas-receiving hollow structure is disposed in a portion of the foam that is in or proximate the corner skin-foam section.

14. The interior panel of claim 1, wherein the interior panel is an instrument panel.

15. The interior panel of claim 14, wherein the instrument panel has a brow section and the gas-receiving hollow structure is disposed in a portion of the foam that is disposed in the brow section.

16. A method of making an interior panel for a motor vehicle, the method comprising the steps of:

disposing a skin covering adjacent to a substrate;

disposing a gas-receiving hollow structure adjacent to the skin covering, wherein the gas-receiving hollow structure has an opening configured for receiving gas and comprises a wall that at least partially surrounds a chamber that is in fluid communication with the opening;

advancing a liquid foam forming material between the skin covering and the substrate and towards the opening of the gas-receiving hollow structure; and solidifying the liquid foam forming material to form a foam, wherein the gas-receiving hollow structure is at least partially disposed in the foam, and wherein the opening is disposed in and completely covered by the foam.

* * * * *